(Model.)
W. S. F. DILLON.
LOCK NUT.
No. 262,579.          Patented Aug. 15, 1882.
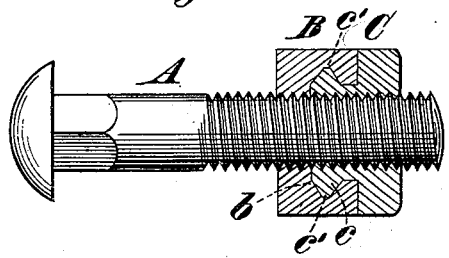
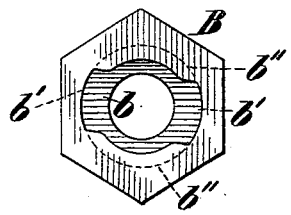 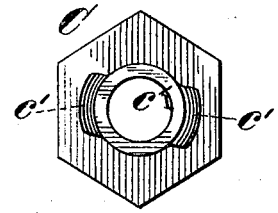
Attest
Chas Schwarz
Louis W. Clason
Inventor
Wm S. F. Dillon

United States Patent Office.

WILLIAM S. F. DILLON, OF MADEIRA, OHIO.

LOCK-NUT.

SPECIFICATION forming part of Letters Patent No. 262,579, dated August 15, 1882.

Application filed June 30, 1882. (Model.)

*To all whom it may concern:*

Be it known that I, WILLIAM STENNETT FORDYCE DILLON, of Madeira, in the county of Hamilton and State of Ohio, have invented a new and useful Improvement in Lock-Nuts; and I do hereby declare that the following specification and accompanying drawings, with references, fully and clearly describe the invention.

Figure 1 is a view in cross-section, showing the combination of the nuts B and C on the bolt A. Figs. 2 and 3 are facial views of the nuts B and C, showing their internal arrangements for the purpose of combining them for action.

In Figs. 1, 2, 3 large letters and small letters, with indices, indicate their different parts.

The invention relates to the combination of two nuts fitted into each other by means of a boss, $c$, on the one and a recess, $b$, in the other. On the opposite sides of the boss $c$ of nut C are flanges $c'$ $c'$, running parallel to the face of the nut. These flanges may be in length nearly one-fourth of the circumference of the boss $c$, and having a conical shape like a thread, but with a different pitch. In the face of the nut B are two slots, $b'$ $b'$, opposite each other, cut downward into the sides of the recess $b$ to allow the flanges $c'$ $c'$ on boss of nut C to pass down. Also in the sides of the recess $b$ of nut B are grooves $b''$ $b''$, cut conically inward to correspond in detail to the flanges $c'$ $c'$ on boss of nut C. These conical inward grooves $b''$ $b''$ in the sides of the recess of nut B meet the slots $b'$ $b'$ in opposite directions.

The nuts being placed face to face, the boss and flanges $c'$ $c'$ are placed into the recess and slots $b'$ $b'$ of nut B, and both pushed up close together. Then the nut C is turned backward, so that the flanges $c'$ $c'$ on the boss will turn or run into the internal conical grooves, $b''$ $b''$, in the sides of the recess of nut B, making the nuts turn with each other precisely in action like a swivel. After the nuts are thus put together they are both threaded with a continuous thread running through them as one nut; and the manner of locking them on the bolt is this: They are both screwed onto the bolt as one nut to any setting-place. The nut C, being turned backward or left, (the action of the swiveled combination is in the same plane as their faces; therefore the nut C traveling over a greater distance on the bolt in a given time than the combination of the swivel will allow,) draws the nut B up against the back part of the threads of the bolt, while itself (nut C) is drawn or forced up against the front part of the threads of the bolt, thereby forming a clamp or lock on the bolt. To unlock the nuts the nut C is turned forward or right until the binding of the internal parts of both nuts is loose, when it will be found that they can be unscrewed from the bolt together.

It is obvious that I can make the flanges $c'$ $c'$ of nut C oblique from the face of nut C, and extend them like a thread round, conical, or square, their obliquity commencing from the right or left, and the grooves $b''$ $b''$ in the recess of nut B to correspond in detail.

It is evident, too, that I can make only one flange running on the half of the boss $c$ of nut C, and an internal groove in the recess $b$ of nut B, running round half-way to correspond in detail.

I claim and desire to secure by Letters Patent—

The combination of the nuts B and C by means of a recess, $b$, in the face of nut B, having slots $b'$ $b'$, opposite each other, with internal grooves, $b''$ $b''$, meeting slots $b'$ $b'$ in opposite directions, and a boss, $c$, on nut C, having elongated flanges $c'$ $c'$, opposite each other, to correspond in detail to the nut B, substantially as herein specified.

In testimony that I claim the foregoing I have hereunto set my hand this 21st day of June, A. D. 1882.

WM. S. F. DILLON.

Witnesses:
CHAS. SCHEASS,
LOUIS W. CLASON.